United States Patent
Zeng et al.

(10) Patent No.: US 11,158,053 B2
(45) Date of Patent: Oct. 26, 2021

(54) IMAGE PROCESSING METHOD, APPARATUS AND DEVICE, AND IMAGE DISPLAY METHOD

(71) Applicant: BOE TECHNOLOGY GROUP CO., LTD., Beijing (CN)

(72) Inventors: Qi Zeng, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 34 days.

(21) Appl. No.: 16/618,747

(22) PCT Filed: Apr. 15, 2019

(86) PCT No.: PCT/CN2019/082657
§ 371 (c)(1),
(2) Date: Dec. 2, 2019

(87) PCT Pub. No.: WO2019/205971
PCT Pub. Date: Oct. 31, 2019

(65) Prior Publication Data
US 2020/0160525 A1    May 21, 2020

(30) Foreign Application Priority Data
Apr. 24, 2018 (CN) .......................... 201810372347.7

(51) Int. Cl.
*G06K 9/00* (2006.01)
*G06T 7/00* (2017.01)
(Continued)

(52) U.S. Cl.
CPC ............ *G06T 7/0016* (2013.01); *G06T 7/564* (2017.01); *G06T 7/60* (2013.01); *G06T 2207/20221* (2013.01); *G06T 2207/30041* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,529,630 B1 * | 3/2003 | Kinjo | ................. | G06K 9/00228 382/118 |
| 7,092,569 B1 * | 8/2006 | Kinjo | ................. | G06K 9/00228 382/170 |

(Continued)

FOREIGN PATENT DOCUMENTS

| | | |
|---|---|---|
| CN | 101617339 A | 12/2009 |
| CN | 103248819 A | 8/2013 |

(Continued)

OTHER PUBLICATIONS

Office Action of CN Application No. 201810372347.7 and translation, dated Dec. 3, 2019, 22 pages.

(Continued)

*Primary Examiner* — Shervin K Nakhjavan
(74) *Attorney, Agent, or Firm* — Muncy, Geissler, Olds & Lowe, P.C.

(57) ABSTRACT

The present disclosure provides an image processing method, apparatus and device, and an image display method. The image processing method includes: acquiring multiple images continuously photographed by a photographing device; performing eye contour extraction on each of the images, thereby acquiring eye contour image data; comparing multiple groups of eye contour image data of an identical eye contour, thereby acquiring optimal eye contour image data of each eye contour; and fusing multiple pieces of acquired optimal eye contour image data with a main image of the images, thereby obtaining a target image.

15 Claims, 2 Drawing Sheets

(51) Int. Cl.
*G06T 7/564* (2017.01)
*G06T 7/60* (2017.01)

(56) References Cited

U.S. PATENT DOCUMENTS

| | | | | |
|---|---|---|---|---|
| 9,025,835 B2* | 5/2015 | Ptucha | | G06T 11/60 |
| | | | | 382/118 |
| 2007/0201724 A1* | 8/2007 | Steinberg | | G06K 9/00845 |
| | | | | 382/103 |
| 2007/0237421 A1* | 10/2007 | Luo | | G06T 11/60 |
| | | | | 382/284 |
| 2008/0317378 A1* | 12/2008 | Steinberg | | H04N 5/232 |
| | | | | 382/275 |
| 2010/0002916 A1* | 1/2010 | Yamaguchi | | H04N 21/4223 |
| | | | | 382/128 |
| 2010/0066840 A1* | 3/2010 | Asukai | | H04N 5/23219 |
| | | | | 348/207.1 |
| 2012/0081560 A1 | 4/2012 | Park et al. | | |
| 2012/0121133 A1* | 5/2012 | Park | | G06T 7/254 |
| | | | | 382/103 |
| 2012/0300092 A1* | 11/2012 | Kim | | H04N 5/2621 |
| | | | | 348/222.1 |
| 2013/0208167 A1 | 8/2013 | Chou et al. | | |
| 2014/0241648 A1* | 8/2014 | Kunishige | | H04N 9/8205 |
| | | | | 382/309 |
| 2015/0262403 A1* | 9/2015 | Yamanashi | | G06T 7/73 |
| | | | | 345/634 |
| 2017/0032172 A1* | 2/2017 | Lee | | H04N 5/2621 |
| 2017/0039761 A1* | 2/2017 | Zhang | | G06T 17/00 |
| 2019/0265784 A1* | 8/2019 | Akahori | | G06T 7/70 |
| 2020/0349731 A1* | 11/2020 | Ye | | G06K 9/22 |
| 2020/0364838 A1* | 11/2020 | Liu | | G06T 11/001 |
| 2020/0372677 A1* | 11/2020 | Yoon | | G06K 9/0061 |

FOREIGN PATENT DOCUMENTS

| | | |
|---|---|---|
| CN | 103548034 A | 1/2014 |
| CN | 104243818 A | 12/2014 |
| CN | 104408428 A | 3/2015 |
| CN | 105827969 A | 8/2016 |
| CN | 107622483 A | 1/2018 |
| CN | 107734253 A | 2/2018 |
| CN | 108521547 A | 9/2018 |

OTHER PUBLICATIONS

International Search Report of PCT/CN2019/082657 and translation, dated Jul. 12, 2019, 16 pages.

* cited by examiner

IMAGE PROCESSING METHOD, APPARATUS AND DEVICE, AND IMAGE DISPLAY METHOD

CROSS-REFERENCE TO RELATED APPLICATION

This application is the U.S. national phase of PCT Application No. PCT/CN2019/082657 filed on Apr. 15, 2019, which claims the priority of the Chinese patent application No. 201810372347.7 filed on Apr. 24, 2018, which is incorporated herein by reference in its entirety.

TECHNICAL FIELD

The present disclosure relates to the field of image processing technologies, and in particular to an image processing method, apparatus and device, and an image display method.

BACKGROUND

When a person is photographed by using a photographing device, the person being photographed may inevitably have a blinking motion, resulting in defects in a photographed image, which is not satisfactory.

SUMMARY

In one aspect, an embodiment of the present disclosure provides an image processing method, including:

acquiring multiple images continuously photographed by a photographing device;

performing eye contour extraction on each of the images, thereby acquiring eye contour image data;

comparing multiple groups of eye contour image data of an identical eye contour, thereby acquiring optimal eye contour image data of each eye contour; and fusing multiple pieces of acquired optimal eye contour image data with a main image of the images, thereby obtaining a target image.

Optionally, a quantity of consecutively photographed images is equal to a blink period of the human eye multiplied by a quantity of images photographed per second by the photographing device, and is not greater than a maximum quantity of images allowed to be cached in a memory of the photographing device.

Optionally, comparing multiple groups of eye contour image data of an identical eye contour, thereby acquiring optimal eye contour image data of each eye contour, includes:

counting a quantity of eye contours included in each image, dividing the multiple images into at least one group with an identical quantity of eye contours included in each of images in each group of images;

taking one group of images with the largest quantity of eye contours, where the one group of images includes N images, each image includes m eye contours, and N and m are positive integers greater than one;

numbering each eye contour graphic in each image of the one group of images, where eye contour graphics in a first image are numbered as 1-1, . . . 1-m, respectively, and eye contour graphics in an N-th image are numbered as N-1, . . . N-m, respectively;

taking the eye contour graphics numbered 1-1, . . . , N-1, as a group, . . . , taking the eye contour graphics numbered 1-m, . . . N-m, as a group, thereby obtaining m groups of eye contour graphics; and processing each group of eye contour graphics to obtain optimal eye contour image data corresponding to each group of eye contour graphics, and taking the optimal eye contour image data corresponding to each group of eye contour graphics as optimal eye contour image data of an i-th eye contour corresponding to the each group of eye contour graphics, where i is a positive integer less than m.

Optionally, processing each group of eye contour graphics to obtain optimal eye contour image data corresponding to each group of eye contour graphics, includes: calculating a maximum distance between an upper edge and a lower edge of each eye contour in each group of eye contour graphics, and taking eye contour image data corresponding to a maximum value of the maximum distances as the optimal eye contour image data.

Optionally, the image processing method further includes:

counting a quantity of optimal eye contour image data included in each of the N images; and taking the image corresponding to a maximum value of the quantities as the main image.

One embodiment of the present disclosure further provides an image processing device, including:

an image input circuit configured to acquire multiple images continuously photographed by a photographing device;

an eye contour extraction circuit configured to perform eye contour extraction on each of the images, thereby acquiring eye contour image data;

a processing circuit configured to compare multiple groups of eye contour image data of an identical eye contour, thereby acquiring optimal eye contour image data of each eye contour; and a fusion circuit configured to fuse multiple pieces of acquired optimal eye contour image data with a main image of the multiple images, thereby obtaining a target image.

Optionally, the processing circuit includes:

a first grouping sub-circuit configured to count a quantity of eye contours included in each image, and divide the multiple images into at least one group with an identical quantity of eye contours included in each of images in each group of images;

a first calculating sub-circuit configured to take one group of images with the largest quantity of eye contours, where the one group of images includes N images, each image includes m eye contours, and N and m are positive integers greater than one;

a numbering sub-circuit configured to number each eye contour graphic in each image of the one group of images, where eye contour graphics in a first image are numbered as 1-1, . . . 1-m, respectively, and eye contour graphics in an N-th image are numbered as N-1, . . . N-m, respectively;

a second grouping sub-circuit configured to take the eye contour graphics numbered 1-1, . . . , N-1, as a group, . . . , take the eye contour graphics numbered 1-m, . . . N-m, as a group, thereby obtaining m groups of eye contour graphics; and a second calculating sub-circuit configured to process each group of eye contour graphics to obtain optimal eye contour image data corresponding to each group of eye contour graphics, and take the optimal eye contour image data corresponding to each group of eye contour graphics as optimal eye contour image data of an i-th eye contour corresponding to the each group of eye contour graphics, where i is a positive integer less than m.

Optionally, the second calculating sub-circuit is further configured to calculate a maximum distance between an upper edge and a lower edge of each eye contour in each group of eye contour graphics, and take eye contour image data corresponding to a maximum value of the maximum distances as the optimal eye contour image data.

One embodiment of the present disclosure further provides an image processing device, including: a memory, a processor, and a computer program stored on the memory and executable by the processor; wherein the processor executes the program to implement the above image processing method.

One embodiment of the present disclosure further provides a computer readable storage medium including a computer program stored thereon; wherein when the program is executed by a processor, steps of the above image processing method are implemented.

One embodiment of the present disclosure further provides an image display method, including: acquiring multiple images continuously photographed by a photographing device; performing eye contour extraction on each of the images, thereby acquiring eye contour image data; comparing multiple groups of eye contour image data of an identical eye contour, thereby acquiring optimal eye contour image data of each eye contour; fusing multiple pieces of acquired optimal eye contour image data with a main image of the multiple images, thereby obtaining a target image; and displaying the target image.

Optionally, displaying the target image includes: displaying the target image through the photographing device.

Optionally, acquiring multiple images continuously photographed by a photographing device, includes: using an image processing device to acquire multiple images continuously photographed by the photographing device.

Optionally, before acquiring multiple images continuously photographed by a photographing device, the method further includes: establishing communication between the image processing device and the photographing device.

DETAILED DESCRIPTION

In order to make the technical problems to be solved, the technical solutions and the advantages of embodiments of the present disclosure more apparent, description will be described hereinafter in conjunction with the drawings and embodiments.

In view of the problems in the related art that blinking motions of a person being photographed result in defects in a photographed image, embodiments of the present disclosure provides an image processing method, apparatus and device, which can repair image defects caused by blinking motions.

Figure 1:
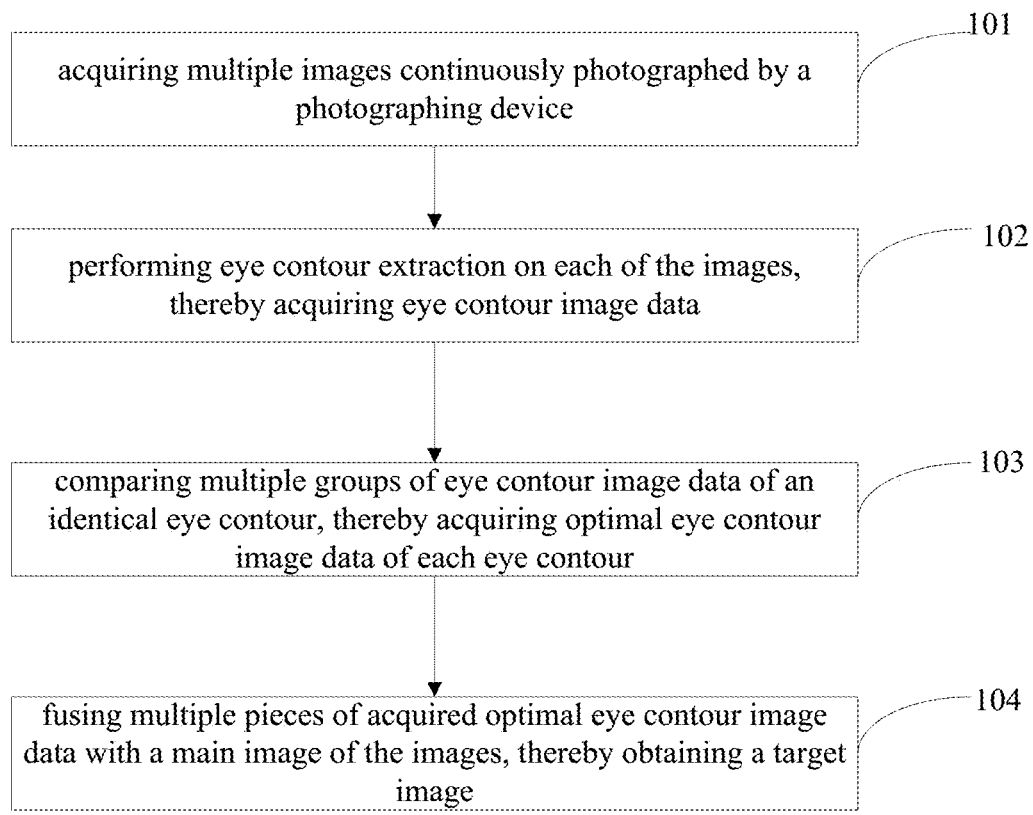
FIG. 1 is a schematic flow chart of an image processing method according to an embodiment of the present disclosure.

One embodiment of the present disclosure provides an image processing method, as shown in FIG. 1, including:

step 101: acquiring multiple images continuously photographed by a photographing device;

step 102: performing eye contour extraction on each of the images, thereby acquiring eye contour image data;

step 103: comparing multiple groups of eye contour image data of an identical eye contour, thereby acquiring optimal eye contour image data of each eye contour; and step 104: fusing multiple pieces of acquired optimal eye contour image data with a main image of the multiple images, thereby obtaining a target image.

In this embodiment, multiple images continuously photographed by the photographing device are acquired, eye contour extraction is performed on each of the images to acquire eye contour image data; multiple groups of eye contour image data of an identical eye contour are compared to acquire an optimal eye contour image data of each eye contour; and multiple pieces of acquired optimal eye contour image data are combined with other parts to obtain a target image. The technical solutions of the present disclosure can repair image defects caused by blinking motions and improve quality of photographed images.

Optionally, a quantity of consecutively photographed images is equal to a blink period of the human eye multiplied by a quantity of images photographed per second by the photographing device, and is not greater than a maximum quantity of images allowed to be cached in a memory of the photographing device.

Optionally, comparing multiple groups of eye contour image data of an identical eye contour, thereby acquiring optimal eye contour image data of each eye contour, includes:

counting a quantity of eye contours included in each image, dividing the multiple images into at least one group with an identical quantity of eye contours included in each of images in each group of images;

taking one group of images with the largest quantity of eye contours, where the one group of images includes N images, each image includes m eye contours, and N and m are positive integers greater than one;

numbering each eye contour graphic in each image of the one group of images, where eye contour graphics in a first image are numbered as 1-1, . . . 1-m, respectively, and eye contour graphics in an N-th image are numbered as N-1, . . . N-m, respectively;

taking the eye contour graphics numbered 1-1, . . . , N-1, as a group, . . . , taking the eye contour graphics numbered 1-m, . . . N-m, as a group, thereby obtaining m groups of eye contour graphics; and processing each group of eye contour graphics to obtain optimal eye contour image data corresponding to each group of eye contour graphics, and taking the optimal eye contour image data corresponding to each group of eye contour graphics as optimal eye contour image data of an i-th eye contour corresponding to the each group of eye contour graphics, where i is a positive integer less than m.

Optionally, processing each group of eye contour graphics to obtain optimal eye contour image data corresponding to each group of eye contour graphics, includes:

calculating a maximum distance between an upper edge and a lower edge of each eye contour in each group of eye contour graphics, and taking eye contour image data corresponding to a maximum value of the maximum distances as the optimal eye contour image data.

Optionally, the method further includes:

counting a quantity of optimal eye contour image data included in each of the N images; and taking the image corresponding to a maximum value of the quantities as the main image.

Figure 2:
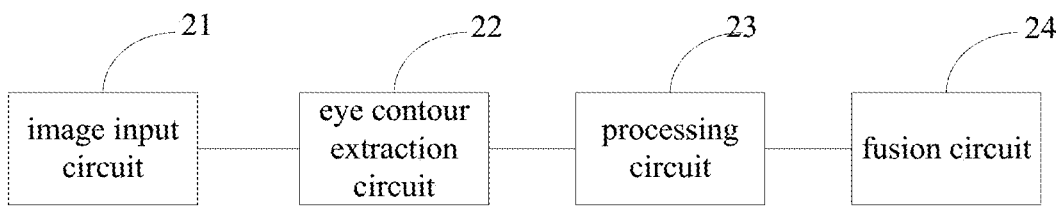
FIG. 2 is a schematic structural diagram of an image processing device according to an embodiment of the present disclosure.

One embodiment of the present disclosure further provides an image processing device, as shown in FIG. 2, including:

an image input circuit 21 configured to acquire multiple images continuously photographed by a photographing device;

an eye contour extraction circuit 22 configured to perform eye contour extraction on each of the images, thereby acquiring eye contour image data;

a processing circuit 23 configured to compare multiple groups of eye contour image data of an identical eye contour, thereby acquiring optimal eye contour image data of each eye contour; and a fusion circuit configured to fuse multiple pieces of acquired optimal eye contour image data with a main image of the multiple images, thereby obtaining a target image.

In this embodiment, multiple images continuously photographed by the photographing device are acquired, eye contour extraction is performed on each of the images to acquire eye contour image data; multiple groups of eye contour image data of an identical eye contour are compared to acquire an optimal eye contour image data of each eye contour; and multiple pieces of acquired optimal eye contour image data are combined with other parts to obtain a target image. The technical solutions of the present disclosure can repair image defects caused by blinking motions and improve quality of photographed images.

Figure 3:
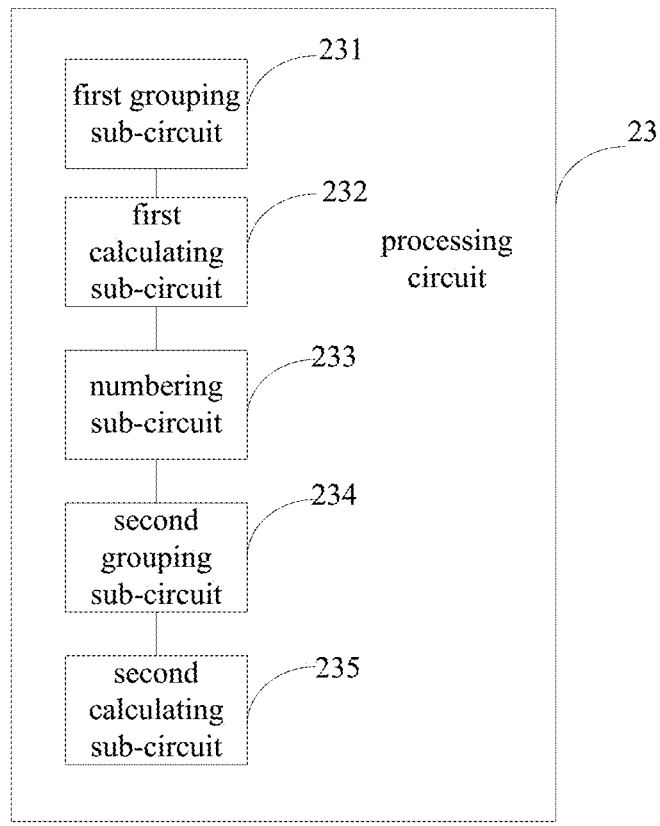
FIG. 3 is a schematic structural diagram of a processing circuit according to an embodiment of the present disclosure.

Optionally, as shown in FIG. 3, the processing circuit 23 includes:

a first grouping sub-circuit 231 configured to count a quantity of eye contours included in each image, and divide the multiple images into at least one group with an identical quantity of eye contours included in each of images in each group of images;

a first calculating sub-circuit 232 configured to take one group of images with the largest quantity of eye contours, where the one group of images includes N images, each image includes m eye contours, and N and m are positive integers greater than one;

a numbering sub-circuit 233 configured to number each eye contour graphic in each image of the one group of images, where eye contour graphics in a first image are numbered as 1-1, . . . 1-m, respectively, and eye contour graphics in an N-th image are numbered as N-1, . . . N-m, respectively;

a second grouping sub-circuit 234 configured to take the eye contour graphics numbered 1-1, . . . , N-1, as a group, . . . , take the eye contour graphics numbered 1-m, . . . N-m, as a group, thereby obtaining m groups of eye contour graphics; and a second calculating sub-circuit 235 configured to process each group of eye contour graphics to obtain optimal eye contour image data corresponding to each group of eye contour graphics, and take the optimal eye contour image data corresponding to each group of eye contour graphics as optimal eye contour image data of an i-th eye contour corresponding to the each group of eye contour graphics, where i is a positive integer less than m.

Optionally, the second calculating sub-circuit 235 is further configured to calculate a maximum distance between an upper edge and a lower edge of each eye contour in each group of eye contour graphics, and take eye contour image data corresponding to a maximum value of the maximum distances as the optimal eye contour image data.

The image processing method and the image processing device of the present disclosure will be specifically described hereinafter in conjunction with a specific example.

The image processing device of this embodiment may be integrated in the photographing device or may be separately disposed from the photographing device. When the image processing device is separately disposed from the photographing device, the image processing device can establish communication with the photographing device and receive data transmitted from the photographing device.

Figure 4:
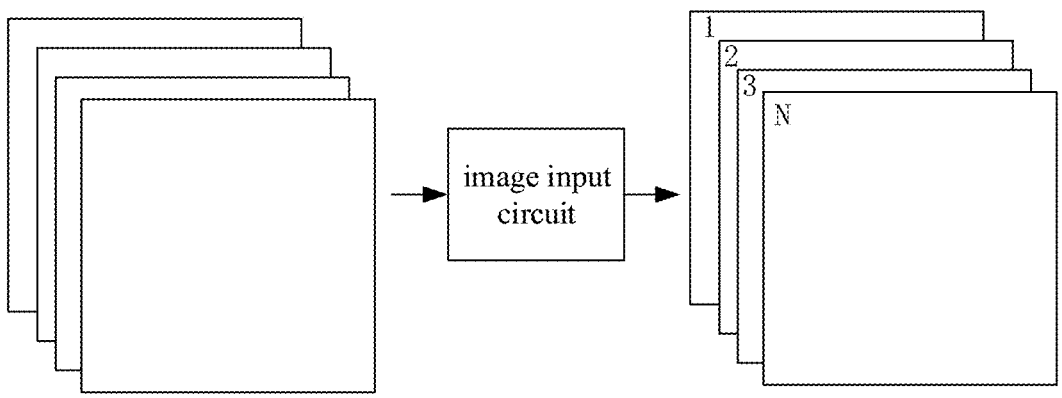
FIG. 4 is a schematic diagram showing that an image input circuit acquires multiple images which are continuously photographed according to an embodiment of the present disclosure.

Firstly, the photographing device is set to be in the continuous shooting mode, and multiple images are continuously photographed. The images may include a blink image of the person being photographed, and this embodiment needs to repair this defect. The image input circuit is controlled to acquire multiple images continuously photographed. Specifically, as shown in FIG. 4, the image input circuit is controlled to receive image data of a standard format returned by the photographing device, and number the images, for example, N images include a first image to an N-th image, where N depends on a shutter speed, and is equal to a blink period of the human eye multiplied by a quantity of images photographed per second by the photographing device, and is not greater than a maximum quantity of images allowed to be cached in a memory of the photographing device. Specifically, the blink period of the normal person may be 4 seconds.

After the image input circuit is started to receive N images, the N images can be cached into the cache according to their serial numbers.

Then, the eye contour extraction circuit can perform eye contour extraction on each of the images by using digital image processing technology in the related art, thereby obtaining eye contour image data. Each eye contour image data is numbered and corresponding original eye contour graphics are stored. For example, the fifth eye contour data of the first image is numbered as 1-5, the sixth eye contour data of the second image is numbered as 2-6, and so on.

After obtaining all the eye contour image data, a quantity of eye contours included in each image is counted, the quantity of eye contours, which is included in the maximum number of images, is taken as a standard quantity m, and other images are deleted. Each of the remaining images includes m eye contours.

Figure 5:
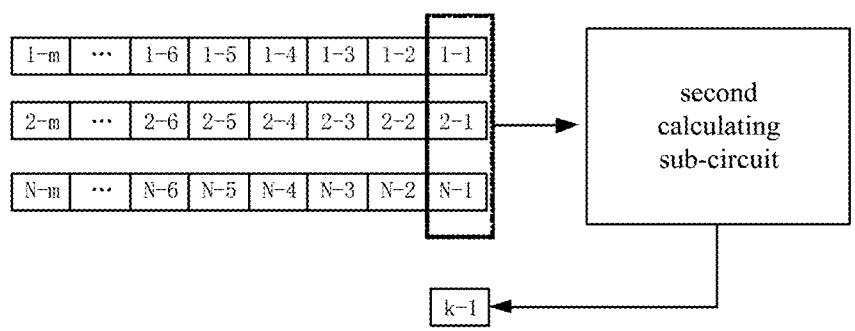
FIG. 5 is a schematic diagram of extracting optimal eye contour image data according to an embodiment of the present disclosure.

The eye contour image data with the same serial number of different images is sequentially transmitted to the processing circuit, and the processing circuit returns the optimal eye contour image data of each eye contour. As shown in FIG. 5, the processing circuit receives m eye contour image data of the first image, which are numbered as 1-1, 1-2, . . . , 1-m, respectively; m eye contour image data of the second image, which are numbered as 2-1, 2-2, . . . , 2-m, respectively; . . . ; m eye contour image data of the N-th image, which are numbered as N-1, N-2, . . . N-m, respectively. Multiple groups of eye contour image data of each eye contour are compared, thereby acquiring an optimal eye contour image data of each eye contour. For example, eye contour image data, which are numbered as 1-1, 2-1, . . . , N-1, are compared, and then the optimal eye contour image data is the eye contour image data which is numbered as 1-1. The above operation are repeated, until the optimal eye contour image data for each eye contour is acquired, i.e., [1-1, 2-1, 3-1, 4-1, . . . ].

When determining the optimal eye contour image data in one group of eye contour image data, a maximum distance between an upper edge and a lower edge of each eye contour graphic is calculated, and the eye contour image data corresponding to a maximum value of the maximum distances as the optimal eye contour image data, and the corresponding serial number such as (k-1) is output. By comparing the maximum distances of the upper and lower edges of the eye contour, the optimal eye contour image data when eyes open, is selected, thereby eliminating blinking interference data.

The quantity of optimal eye contour image data included in each image of the N images are counted, the image including the most optimal eye contour image data is taken as the main image, and all the extracted optimal eye contour image data are combined with the main image, thereby obtaining the final target image and presenting the final target image to users. The final target image can eliminate image defects caused by blinking motion. By taking the image including the most optimal eye contour image data as the main image, the complexity of fusion can be reduced.

After the target image is output, the local cache is cleared to prepare for the next input buffer operation of the image input circuit.

According to the image processing device of the present embodiment, when photographing a face, it is possible to perform real-time repair for the blinking motion to give the user a better experience.

One embodiment of the present disclosure further provides an image processing device including a memory, a processor, and a computer program stored on the memory and executable by the processor; the processor executes the program to implement the above the image processing method.

When the processor executes the program, the following steps are specifically performed:

acquiring multiple images continuously photographed by a photographing device;

performing eye contour extraction on each of the images, thereby acquiring eye contour image data;

comparing multiple groups of eye contour image data of an identical eye contour, thereby acquiring an optimal eye contour image data of each eye contour; and fusing multiple pieces of acquired optimal eye contour image data with a main image of the multiple images, thereby obtaining a target image.

Optionally, a quantity of consecutively photographed images is equal to a blink period of the human eye multiplied by a quantity of images photographed per second by the photographing device, and is not greater than a maximum quantity of images allowed to be cached in a memory of the photographing device.

Optionally, when the processor executes the program, the following steps are specifically performed:

counting a quantity of eye contours included in each image, dividing the multiple images into at least one group with an identical quantity of eye contours included in each of images in each group of images;

taking one group of images with the largest quantity of eye contours, where the one group of images includes N images, each image includes m eye contours, and N and m are positive integers greater than one;

numbering each eye contour graphic in each image of the one group of images, where eye contour graphics in a first image are numbered as 1-1, . . . 1-m, respectively, and eye contour graphics in an N-th image are numbered as N-1, . . . . N-m, respectively;

taking the eye contour graphics numbered 1-1, . . . , N-1, as a group, . . . , taking the eye contour graphics numbered 1-m, . . . N-m, as a group, thereby obtaining m groups of eye contour graphics; and processing each group of eye contour graphics to obtain optimal eye contour image data corresponding to each group of eye contour graphics, and taking the optimal eye contour image data corresponding to each group of eye contour graphics as optimal eye contour image data of an i-th eye contour corresponding to the each group of eye contour graphics, where i is a positive integer less than m.

Optionally, when the processor executes the program, the following steps are specifically performed:

calculating a maximum distance between an upper edge and a lower edge of each eye contour in each group of eye contour graphics, and taking eye contour image data corresponding to a maximum value of the maximum distances as the optimal eye contour image data.

Optionally, when the processor executes the program, the following steps are specifically performed:

counting a quantity of optimal eye contour image data included in each of the N images; and taking the image corresponding to a maximum value of the quantities as the main image.

One embodiment of the present disclosure further provides a computer readable storage medium having a computer program stored thereon. When the program is executed by a processor, the steps of the above image processing method is implemented.

It will be appreciated that the embodiments described herein may be implemented in hardware, software, firmware, middleware, microcode, or a combination thereof. For hardware implementation, the processing circuit may be implemented in one or more of Application Specific Integrated Circuits (ASICs), Digital Signal Processing (DSP), DSP Device (DSPD), programmable Logic Device (PLD), Field-Programmable Gate Array (FPGA), general purpose processor, controller, microcontroller, microprocessor, other electronic circuit for performing functions of the present application or a combination thereof.

For software implementation, the techniques described herein may be implemented by circuits (i.e., procedures, functions, and so on) that perform the functions described herein. Software codes may be stored in memory and executed by the processor. The memory may be implemented in the processor or external to the processor.

The various embodiments in the present specification are described in a progressive manner, and each embodiment focuses on differences from other embodiments, and the same or similar parts between the various embodiments can be referred to each other.

Those skilled in the art will appreciate that embodiments of the disclosed embodiments may be provided as a method, a device, or a computer program product. Thus, the embodiments of the present disclosure may take the form of an entirely hardware embodiment, an entirely software embodiment, or a combination of software and hardware. Moreover, the embodiments of the present disclosure may take the form of a computer program product embodied on one or more computer usable storage media (including but not limited to a disk storage, CD-ROM, an optical storage, etc.) including computer usable program codes.

Embodiments of the present disclosure have been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction circuit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although optional embodiments of the embodiments of the present invention have been described, it will be apparent that those skilled in the art can make further changes and modifications to the embodiments. Therefore, the appended claims are intended to be interpreted as including the optional embodiments and all changes and modifications that fall within the scope of the present disclosure.

It should also be noted that in this application, relational terms such as first and second are merely used to differentiate different components rather than to represent any order, number or importance. Further, the term "including", "include" or any variants thereof is intended to cover a non-exclusive contain, so that a process, a method, an article or a terminal device, which includes a series of elements, includes not only those elements, but also includes other elements which are not explicitly listed, or elements inherent in such a process, method, article or terminal device. In absence of any further restrictions, an element defined by the phrase "including one . . . " does not exclude the existence of additional identical elements in a process, method, article, or terminal device that includes the element.

The above are merely the preferred embodiments of the present disclosure. It should be noted that, a person skilled in the art may make improvements and modifications without departing from the principle of the present disclosure, and these improvements and modifications shall also fall within the scope of the present disclosure.

What is claimed is:

1. An image processing method, comprising:
   acquiring multiple images continuously photographed by a photographing device;
   performing eye contour extraction on each of the images, thereby acquiring eye contour image data;
   comparing multiple groups of eye contour image data of an identical eye contour, thereby acquiring optimal eye contour image data of each eye contour; and
   fusing multiple pieces of acquired optimal eye contour image data with a main image of the images, thereby obtaining a target image,
   wherein a quantity of the images consecutively photographed is equal to a blink period of the human eye multiplied by a quantity of images photographed per second by the photographing device, and is not greater than a maximum quantity of images allowed to be cached in a memory of the photographing device.

2. The image processing method according to claim 1, wherein comparing multiple groups of eye contour image data of an identical eye contour, thereby acquiring optimal eye contour image data of each eye contour, includes:
   counting a quantity of eye contours included in each image, dividing the images into at least one group with an identical quantity of eye contours included in each of images in each group of images;
   taking one group of images with the largest quantity of eye contours, wherein the one group of images includes N images each including m eye contours, and N and m are positive integers greater than one;
   numbering each eye contour graphic in each image of the one group of images, wherein eye contour graphics in a first image are numbered as 1-1, . . . 1-m, respectively, and eye contour graphics in an N-th image are numbered as N-1, . . . N-m, respectively;
   taking the eye contour graphics numbered 1-1, . . . , N-1, as a group, . . . , taking the eye contour graphics numbered 1-m, . . . , N-m, as a group, thereby obtaining m groups of eye contour graphics; and
   processing each group of eye contour graphics to obtain optimal eye contour image data corresponding to each group of eye contour graphics, and taking the optimal eye contour image data corresponding to each group of eye contour graphics as optimal eye contour image data of an i-th eye contour corresponding to the each group of eye contour graphics, wherein i is a positive integer less than m.

3. The image processing method according to claim 2, wherein processing each group of eye contour graphics to obtain optimal eye contour image data corresponding to each group of eye contour graphics, includes:
   calculating a maximum distance between an upper edge and a lower edge of each eye contour in each group of eye contour graphics, and taking eye contour image data corresponding to a maximum value of the maximum distances as the optimal eye contour image data.

4. The image processing method according to claim 2, further comprising:
   counting a quantity of optimal eye contour image data included in each of the N images; and
   taking the image corresponding to a maximum value of the quantity of optimal eye contour image data included in each of the N images as the main image.

5. An image processing device, comprising: a memory, a processor, and a computer program stored on the memory and executable by the processor; wherein the processor executes the program to implement the image processing method according to claim 1.

6. The image processing device according to claim 5, wherein the processor is configured to, count a quantity of eye contours included in each image, and divide the images into at least one group with an identical quantity of eye contours included in each of images in each group of images;
   take one group of images with the largest quantity of eye contours, wherein the one group of images includes N images each including m eye contours, and N and m are positive integers greater than one;

number each eye contour graphic in each image of the one group of images, wherein eye contour graphics in a first image are numbered as 1-1, . . . 1-m, respectively, and eye contour graphics in an N-th image are numbered as N-1, . . . N-m, respectively;

take the eye contour graphics numbered 1-1, . . . , N-1, as a group, . . . , take the eye contour graphics numbered 1-m, . . . , N-m, as a group, thereby obtaining m groups of eye contour graphics; and process each group of eye contour graphics to obtain optimal eye contour image data corresponding to each group of eye contour graphics, and take the optimal eye contour image data corresponding to each group of eye contour graphics as optimal eye contour image data of an i-th eye contour corresponding to the each group of eye contour graphics, wherein i is a positive integer less than m.

7. The image processing device according to claim 6, wherein the processor is configured to, calculate a maximum distance between an upper edge and a lower edge of each eye contour in each group of eye contour graphics, and take eye contour image data corresponding to a maximum value of the maximum distances as the optimal eye contour image data.

8. A non-transitory computer readable storage medium comprising a computer program stored thereon; wherein when the program is executed by a processor, steps of the image processing method according to claim 1.

9. An image display method, comprising:
obtaining a target image in accordance with the image processing method according to claim 1; and
displaying the target image.

10. The image display method according to claim 9, wherein displaying the target image includes: displaying the target image through the photographing device.

11. The image display method according to claim 9, wherein acquiring multiple images continuously photographed by a photographing device, includes: using an image processing apparatus to acquire multiple images continuously photographed by the photographing device.

12. The image display method according to claim 11, wherein before acquiring multiple images continuously photographed by a photographing device, the method further includes: establishing communication between the image processing apparatus and the photographing device.

13. An image display apparatus, comprising:
a photographing device including a cache configured to store a plurality of images; and
an image processing device;
wherein the image processing device includes: a memory, a processor, and a computer program stored on the memory and executable by the processor; wherein the processor executes the program to implement the image processing method according to claim 1.

14. An image processing device, comprising:
an image input circuit configured to acquire multiple images continuously photographed by a photographing device;
an eye contour extraction circuit configured to perform eye contour extraction on each of the images, thereby acquiring eye contour image data;
a processing circuit configured to compare multiple groups of eye contour image data of an identical eye contour, thereby acquiring optimal eye contour image data of each eye contour; and
a fusion circuit configured to fuse multiple pieces of acquired optimal eye contour image data with a main image of the multiple images, thereby obtaining a target image,
wherein the processing circuit includes:
a first grouping sub-circuit configured to count a quantity of eye contours included in each image, and divide the images into at least one group with an identical quantity of eye contours included in each of images in each group of images;
a first calculating sub-circuit configured to take one group of images with the largest quantity of eye contours, wherein the one group of images includes N images each including m eye contours, and N and m are positive integers greater than one;
a numbering sub-circuit configured to number each eye contour graphic in each image of the one group of images, wherein eye contour graphics in a first image are numbered as 1-1, . . . 1-m, respectively, and eye contour graphics in an N-th image are numbered as N-1, . . . N-m, respectively;
a second grouping sub-circuit configured to take the eye contour graphics numbered 1-1, . . . , N-1, as a group, . . . , take the eye contour graphics numbered 1-m, . . . , N-m, as a group, thereby obtaining m groups of eye contour graphics; and
a second calculating sub-circuit configured to process each group of eye contour graphics to obtain optimal eye contour image data corresponding to each group of eye contour graphics, and take the optimal eye contour image data corresponding to each group of eye contour graphics as optimal eye contour image data of an i-th eye contour corresponding to the each group of eye contour graphics, wherein i is a positive integer less than m.

15. The image processing device according to claim 14, wherein the second calculating sub-circuit is further configured to calculate a maximum distance between an upper edge and a lower edge of each eye contour in each group of eye contour graphics, and take eye contour image data corresponding to a maximum value of the maximum distances as the optimal eye contour image data.

\* \* \* \* \*